(12) United States Patent
Cole

(10) Patent No.: US 8,083,952 B2
(45) Date of Patent: Dec. 27, 2011

(54) FILTER BOWL SUPPORTS AND FILTER SYSTEMS COMPRISING THE SAME

(75) Inventor: Hughie C. Cole, Cynthiana, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 635 days.

(21) Appl. No.: 12/323,120

(22) Filed: Nov. 25, 2008

(65) Prior Publication Data

US 2010/0126947 A1 May 27, 2010

(51) Int. Cl.
*B01D 24/46* (2006.01)
*B01D 35/30* (2006.01)

(52) U.S. Cl. ........ 210/791; 210/232; 210/237; 210/238; 210/249; 210/443

(58) Field of Classification Search .................. 210/791, 210/232, 237, 238, 249, 443
See application file for complete search history.

(56) References Cited

U.S. PATENT DOCUMENTS

| | | | |
|---|---|---|---|
| 2,081,009 A | 5/1937 | Kelley | |
| 2,511,292 A | 6/1950 | Myers | |
| 6,740,235 B2 | 5/2004 | Gill | |
| 6,800,199 B1 * | 10/2004 | Rhee | 210/232 |
| 7,138,052 B2 | 11/2006 | Reid | |
| 7,138,053 B2 * | 11/2006 | Sato | 210/232 |
| 7,195,122 B2 | 3/2007 | Hiranaga et al. | |
| 7,374,671 B2 * | 5/2008 | Blake | 210/167.19 |
| 7,686,953 B2 * | 3/2010 | Bailey et al. | 210/198.2 |
| 7,699,983 B2 * | 4/2010 | Andrei | 210/167.1 |
| 7,708,882 B2 * | 5/2010 | Kobayashi | 210/232 |
| 7,901,574 B2 * | 3/2011 | Yukon | 210/198.2 |
| 7,981,283 B2 * | 7/2011 | Happel et al. | 210/162 |
| 2006/0124526 A1 * | 6/2006 | Flick | 210/222 |
| 2006/0201866 A1 | 9/2006 | Stankowski et al. | |
| 2008/0041777 A1 * | 2/2008 | Lee | 210/232 |
| 2008/0251434 A1 * | 10/2008 | Marra | 210/119 |
| 2009/0039008 A1 * | 2/2009 | Davis et al. | 210/237 |
| 2010/0078374 A1 * | 4/2010 | Lee et al. | 210/232 |
| 2010/0282660 A1 * | 11/2010 | Hughes | 210/237 |

* cited by examiner

*Primary Examiner* — Chester Barry
(74) *Attorney, Agent, or Firm* — Dinsmore & Shohl LLP

(57) ABSTRACT

A support for supporting and positioning a filter bowl of a filter system may include a bracket body, a rod, an extension arm threadably connected to the rod and a support band connected to and rotatable with respect to the extension arm. The bracket body may include a top plate. The top plate may include an opening for receiving the rod. The rod may be rotatably positioned in the opening in the top plate and extend from the top plate in a direction away from the top plate of the bracket body. The extension arm may be operable to extend from the bracket body or retract towards the top plate of the bracket body when the rod is rotated. The support band may be configured for attachment to the filter bowl of the filter system.

20 Claims, 6 Drawing Sheets

FILTER BOWL SUPPORTS AND FILTER SYSTEMS COMPRISING THE SAME

TECHNICAL FIELD

The present invention generally relates to filter systems and, more specifically, to filter systems comprising supports for supporting filter bowls when the filter bowl is detached from the filter system.

BACKGROUND

Fluid delivery systems often incorporate filter systems to remove particulate materials and/or other contaminants that may be contained in the fluid. The filter media used in such filter systems requires regular changing as the particulate materials or other contaminants quickly build up in the filter media as a result of the large volume of liquid flowing through the filter system.

Changing the filter media requires that the filter bowl of the filter system be manually removed from the filter head in order to extract the used filter media from the filter bowl. This requires manually supporting the weight of the filter bowl as the filter bowl is detached from the filter head. As such, the individual performing the filter change must both support the weight of the filter bowl as well as perform any other operations required to remove the filter bowl from the filter head, such as unscrewing the filter bowl from the filter head or otherwise removing fasteners connecting the filter bowl to the filter head.

Due to the large volume of fluid flow and high pressures which the filter systems are designed to accommodate, the various components of the filter system, including the filter bowl, may be large and heavy. Particulate matter entrapped in the filter media and excess liquid contained in the filter bowl may add to the already significant weight of the filter bowl. Due to the size and weight of the filter bowl and the used filter media contained in the filter bowl, manually changing the filter media may present an ergonomic burden on the individual performing the operation.

Accordingly, a need exists for alternative devices for supporting a filter housing while changing the filter media in a filter system.

SUMMARY

A support for supporting and positioning a filter bowl of a filter system may include a bracket body, a rod, an extension arm threadably connected to the rod and a support band connected to and rotatable with respect to the extension arm. The bracket body may include a top plate. The top plate may include an opening for receiving the rod. The rod may be rotatably positioned in the opening in the top plate and extend from the top plate in a direction away from the top plate of the bracket body. The extension arm may be operable to extend from the bracket body or retract towards the top plate of the bracket body when the rod is rotated. The support band may be configured for attachment to the filter bowl of the filter system.

In another embodiment, a filter system may include a filter head, a filter bowl and a filter bowl support. The filter head may include an inlet for receiving fluid from a fluid delivery system and an outlet for returning fluid to the fluid delivery system. The filter bowl may be fluidly coupled to and detachable from the filter head and operable to contain filter media for filtering fluid received through the inlet of the filter head. The filter bowl support may include a bracket body, an extension arm, a rod and a support band. The bracket body may include a top plate connected to the filter head. The top plate may include a hole for receiving the rod. The rod may be rotatably positioned in the hole in the top plate and extend from the top plate in a direction toward away from the top plate of the bracket body. The extension arm may be threadably connected to the rod such that rotation of the rod extends the extension arm from the bracket body or retracts the extension arm into the bracket body. The support band may be connected to the extension arm and rotatable with respect to the extension arm, wherein the support band may be secured to the filter bowl such that the filter bowl is supported by the filter bowl support when the filter bowl is detached from the filter head.

In yet another embodiment, a method for changing filter media in a filter system is disclosed. The filter system includes a filter bowl removably attached to a filter head and supported on the filter head with a filter bowl support. The filter bowl support includes a bracket body connected to the filter head, a rod disposed and supported in the bracket body, an extension arm threadably connected to the rod, and a support band connected to and rotatable with respect to the extension arm. The extension arm may be extendable and retractable from the bracket body by rotating the rod with respect to the bracket body. The support band may be attached to the filter bowl. The method for changing the filter media may include detaching the filter bowl from the filter head such that the filter bowl is supported from the filter head with the filter bowl support. Thereafter, the filter bowl may be lowered from the filter head by extending the extension arm from the bracket body of the filter bowl support. After the filter bowl is lowered, the filter bowl may be rotated on the extension arm about a substantially horizontal axis such that the filter media contained in the filter bowl and any excess fluid and debris in the filter bowl are emptied from the filter bowl. New filter media may then be inserted in the filter bowl. Thereafter, the filter bowl is rotated on the extension arm about the substantially horizontal axis such that the filter bowl is aligned with the filter head. The filter bowl is then raised to the filter head by retracting the extension arm into the bracket body of the filter bowl support. The filter bowl is then reattached to the filter head.

These and additional features provided by the embodiments of the present invention can be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
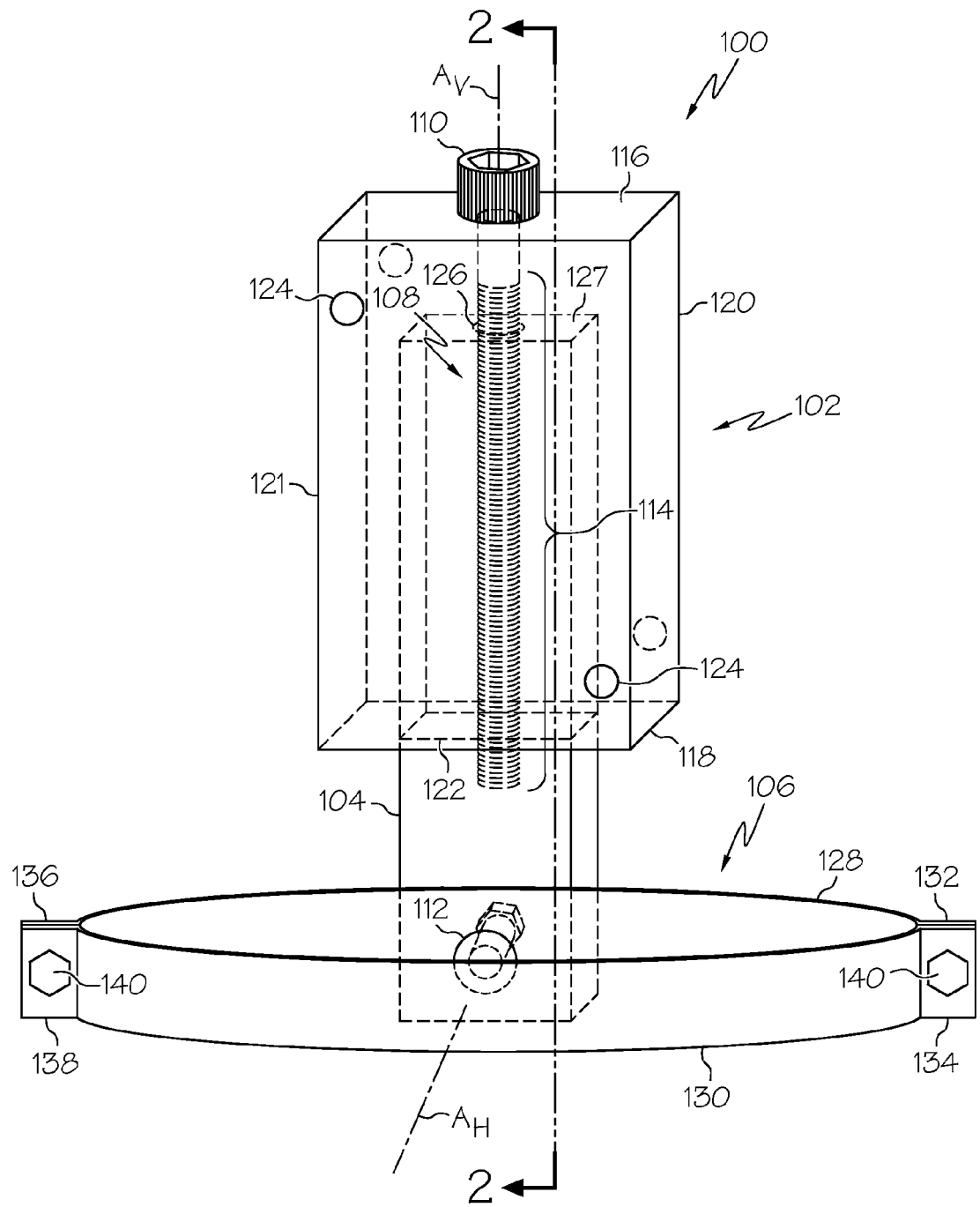
FIG. 1 depicts a filter bowl support according to one or more embodiments shown and described herein.

FIG. 1 generally depicts one embodiment of a filter bowl support for use in conjunction with a filter system comprising a filter head with a removable filter bowl containing filter media. The filter bowl support may be attached to the filter head and operable to support and adjust the position of the filter bowl relative to the filter head when the filter bowl is detached from the filter head, such as when the filter media of the system is changed. The filter bowl support generally comprises a bracket body, an extension arm, a support band and a threaded rod. Various embodiments of the filter bowl support and the operation of the filter bowl support will be described in more detail herein.

Figure 2:
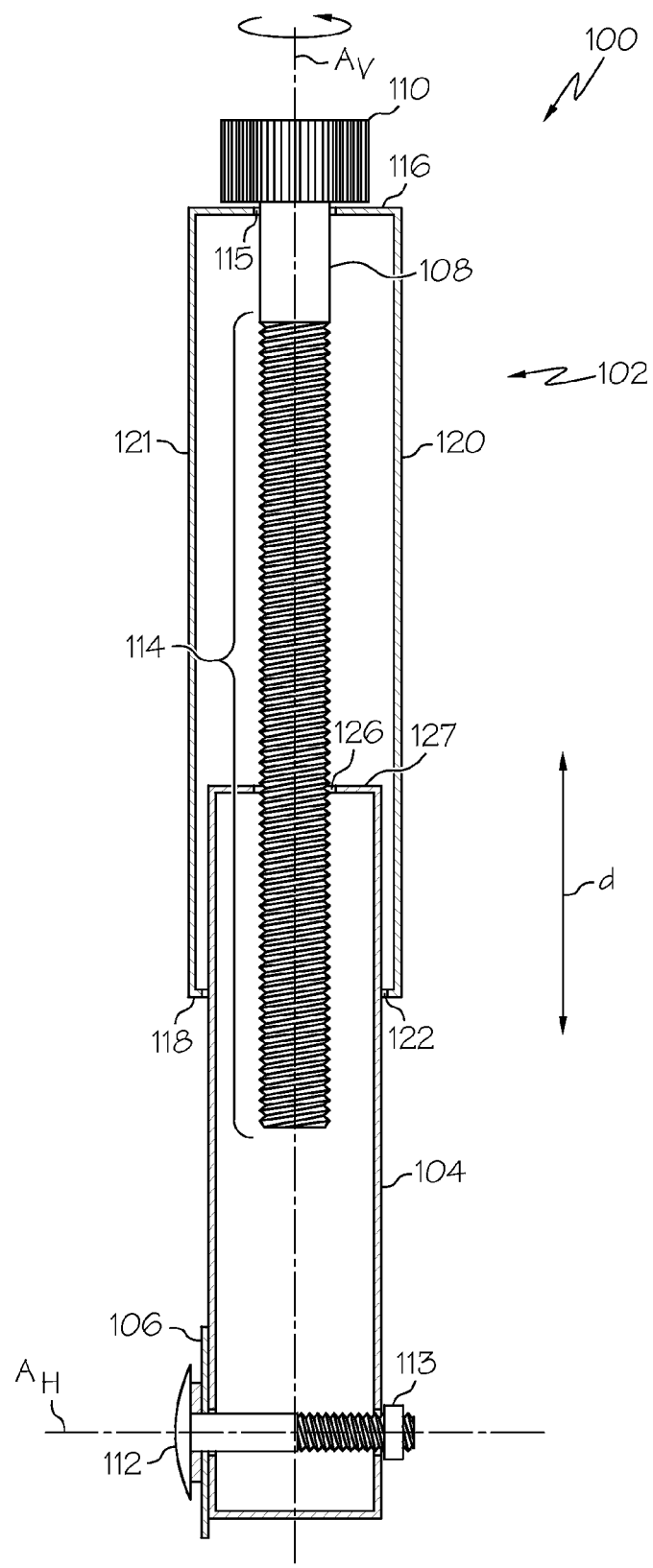
FIG. 2 depicts a cross section of the filter bowl support of FIG. 1.

Referring now to FIGS. 1 and 2, the filter bowl support 100 may generally comprise a bracket body 102, an extension arm 104, a support band 106 and a rod 108. A portion of the support band 106 is shown in cross section in FIG. 2 while an embodiment of the entire support band connected to the filter bowl support 100 is shown in FIG. 1. In one embodiment, the bracket body 102 generally comprises a top plate 116 and a base plate 118 connected by a back plate 120. The top plate 116 and base plate 118 are generally perpendicular to the back plate 120 such that the top plate 116, base plate 118 and back plate 120 generally have a squared-off, c-shaped configuration. In one embodiment, the top plate 116, the base plate 118 and the back plate 120 are integrally formed with one another, such as when the base plate 118, the top plate 116 and the back plate 120 are formed from a single piece of metallic material shaped to achieve the relative orientation of the pieces. In another embodiment, the top plate 116 and/or the base plate 118 are welded to the back plate 120.

In another embodiment (not shown), the bracket body 102 comprises a back plate 121 and a top plate 116. In this embodiment, the top plate 116 is generally perpendicular to the back plate 120 such that the bracket body has a substantially L-shaped configuration.

In one embodiment, as shown in FIG. 1, the bracket body 102 may be a substantially closed structure. For example, the bracket body 102 may further comprise a front plate 121 and side plates (not labeled) such that the bracket body 102 has a rectangular box configuration as depicted in FIG. 1. It should be understood that, in either configuration (e.g., with or without a front plate 121 and/or side plates), the functionality of the bracket body 102 is the same.

While specific reference has been made herein to the bracket body 102 being made of a metallic material (e.g, aluminum alloys, steels, brass, or the like), it should be understood that the bracket body 102 may be made of any material having suitable mechanical strength and rigidity including, without limitation, metals, polymers, composite materials and the like.

As shown in FIG. 1, the back plate 120 of the bracket body 102 may comprise one or more fastener holes 124 for connecting the filter bowl support to another structure. When the bracket body 102 comprises a front plate 121, as shown in FIG. 1, the fastener holes 124 may extend through both the front plate 121 and the back plate 120.

The top plate 116 of the bracket body 102 may comprise a through-hole (not shown) in which the rod 108 may be disposed for rotation relative to the bracket body 102. The rod 108 may comprise an actuator knob 110 and a threaded portion 114. The rod 108 may be positioned in the bracket body such that the actuator knob 110 is positioned on the top plate 116 thereby suspending the rod 108 from the top plate 116 such that the rod 108 extends away from the top plate 116 and is substantially perpendicular to the top plate. When the bracket body comprises a bottom plate 118, as shown in FIGS. 1 and 2, the rod 108 may be of sufficient length to extend through an opening 122 formed in the bottom plate 118, as shown in FIG. 1. The actuator knob 110 of the rod 108 may comprise a socket, such as a hexagonal, square or similarly shaped socket, for receiving a corresponding post of a tool or crank to facilitate rotation of the rod 108 relative to the bracket body 102. Alternatively or additionally, the actuator knob 110 of the threaded rod 108 may comprise grooves as shown in FIG. 1 or similar gripping features, such as knurling or the like, to facilitate hand rotation of the actuator knob 110. The rod 108 generally comprises a vertical axis of rotation $A_v$, as shown in FIGS. 1 and 2, about which the rod 108 may rotate.

As noted hereinabove, in one embodiment, as shown in FIGS. 1 and 2, the filter bowl support 100 may comprise a bottom plate 118. In this embodiment, the bottom plate 118 may comprise an opening 122. The opening 122 is configured to slidably receive the extension arm 104 and thus generally has the same basic geometrical configuration as a horizontal cross section of the extension arm 104. For example, in the embodiment of the filter bowl support 100 shown in FIG. 1, the extension arm 104 generally has a rectangular cross sectional configuration. Accordingly, in this embodiment, the opening 122 in the bottom plate 118 is rectangular such that the extension arm may be slidably received into the opening 122.

The extension arm 104 may be extended from the bracket body 102 and retracted towards the top plate 116 of the bracket body 102. The extension arm is generally an elongated structure having a length in the vertical direction (e.g., a length along the vertical axis of rotation $A_v$) greater than the width in the horizontal direction. In the embodiment shown, the extension arm 104 comprises a rectangular cross section. However, it should be understood that the extension arm 104 may comprise other geometric cross sections including, without limitation, square, circular, octagonal, triangular or the like. The extension arm 104 may be made of any material having suitable mechanical strength including, without limitation, metals, polymers and composite materials. Further, the extension arm 104 may be solid or hollow. In the embodiment shown in FIGS. 1 and 2, the extension arm 104 is hollow and is formed from a metallic material.

As described hereinabove, the extension arm 104 may be retracted towards the top plate of the bracket body 102 or extended from the bracket body 102. The direction of extension and retraction of the extension arm is generally indicated by the arrow "d" in FIG. 2. To facilitate extension and retraction of the extension arm 104 relative to the bracket body 102, the top end 127 of the extension arm 104 comprises a threaded hole 126. In the embodiment of the filter bowl support 100 shown in FIGS. 1 and 2 where the extension arm 104 is hollow, the threaded hole 126 in the extension arm 104 extends through the top end 127 of the extension arm 104. In other embodiments (not shown) of the filter bowl support 100, such as when the extension arm 104 is solid, the threaded hole may extend substantially along an axial length of the extension arm 104 (e.g., along the vertical axis of rotation $A_v$). The rod 108, specifically the threaded portion 114 of the rod 108 may be threaded into the threaded hole 126. Accordingly, by rotating the rod 108 such that the rod is threaded into or out of the extension arm 104, the extension arm 104 may be retracted towards the top plate of the bracket body 102 or extended from the bracket body, respectively.

Figure 6:
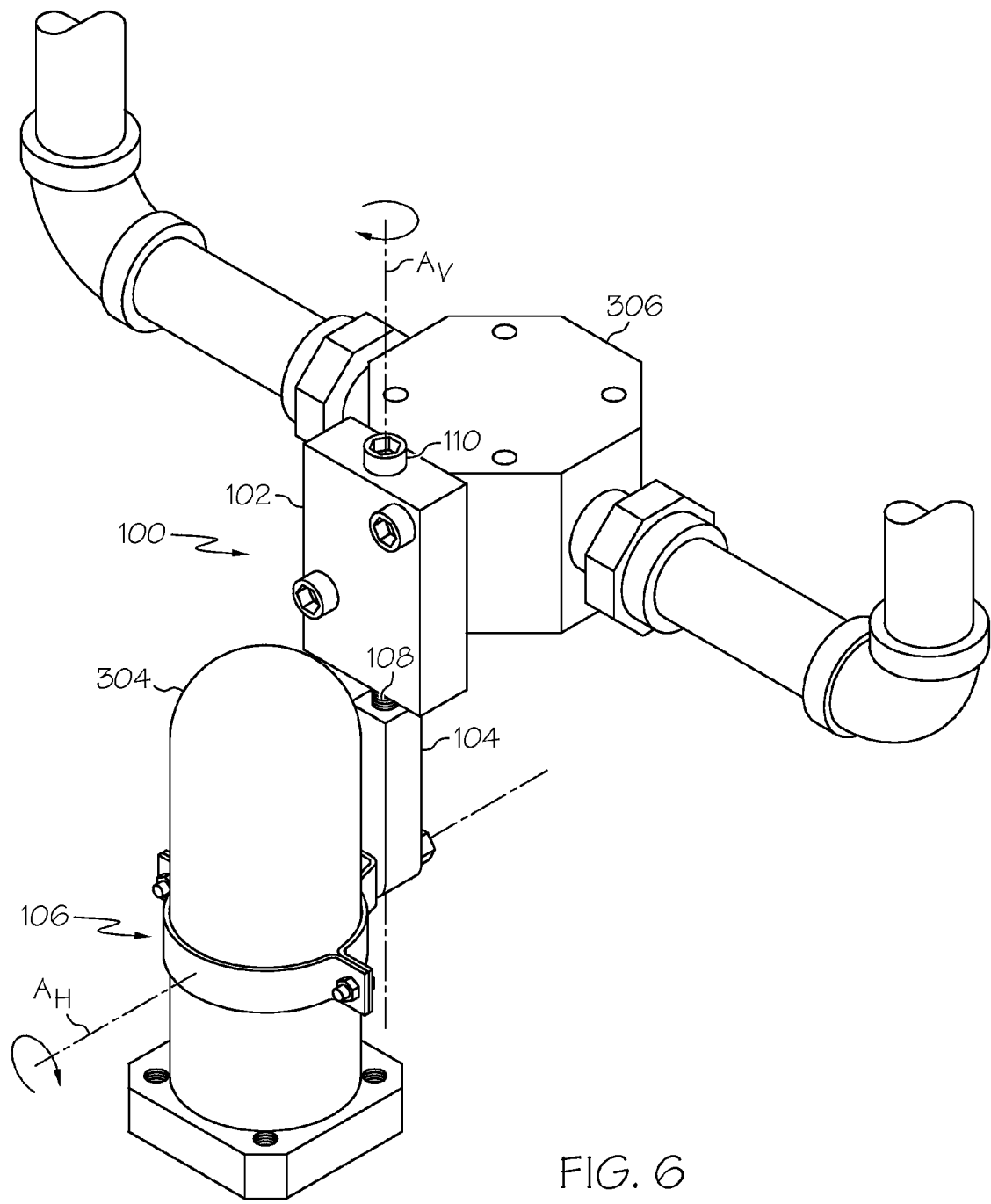

In the embodiment of the filter bowl support 100 shown in FIGS. 1 and 2, the extension arm 104 has a rectangular cross section. In this embodiment, the extension arm 104 may be rotated about the vertical axis of rotation $A_v$ when the extension arm 104 is fully extended from the bracket body 102 (as shown in FIG. 6). In other embodiments, such as when the extension arm 104 is circular in cross section, the extension arm 104 may be rotated about the vertical axis of rotation $A_v$ when the extension arm 104 is fully extended from the bracket body 102 or when the bracket body 102 is fully or partially retracted into the bracket body 102.

The support band 106 may generally comprise a circular or semicircular loop of material which is pivotally attached to the lower end of the support arm 104 with a bolt 112 and nut 113, or other suitable connector, such that the support band 106 may be rotated relative to the extension arm 104 about the horizontal axis of rotation $A_H$. The support band 106 is configured to extend around a filter bowl of a filter system thereby securing the filter bowl to the filter bowl support 100 as further described herein. The support band 106 may be constructed of metals or polymers. For example, in one embodiment (not shown), the support band 106 may be constructed of woven nylon fibers such as ballistic nylon fabric. In this embodiment, the support band 106 may be pivotally attached to the extension arm 104 by passing the bolt 112 through an eyelet or similar opening formed in the support band. The bolt may then pass through the extension arm 104 and may be secured in the extension arm 104 with nut 113. In this embodiment, the support band may comprise a first end and second end. The first end and the second end may be attached to complimentary fasteners such that the ends of the support band may be secured together thereby forming a loop. The complimentary fasteners may comprise adjustment mechanisms such that the tension of the support band may be adjusted when positioned around a filter bowl.

In the embodiment shown in FIGS. 1 and 2, the support band 106 is constructed of a metallic material which is formed to correspond to the outside diameter of a filter bowl, such as the filter bowl 304 shown in FIGS. 3-6. In the embodiment shown, the support band 106 comprises a first portion 128 and a second portion 130. The first portion of the support band 106 may be pivotally attached to the extension arm 104 by passing the bolt 112 through an opening (not shown) formed in the support band 104. A washer may be disposed between the first portion 128 of the support band and the bolt head. The bolt 112 passes through the first portion of the support band 106 and through the extension arm 104 and is secured in the extension arm 104 with nut 113 such that the support band 104 may be rotated with respect to the extension arm 104 about the horizontal axis of rotation $A_H$ which is coaxial with the bolt 112. The first portion 128 of the support band 106 comprises flanges 132, 136 located at either end of the first portion 128. Similarly, the second portion 130 of the support band 106 comprises flanges 134, 138 located at either end of the second portion 130. The first portion 128 of the support band 106 and the second portion of the support band 106 may be attached together to form a loop by aligning the flanges of each portion 128, 130 with the corresponding flanges of the other portion. A threaded connector 140 may be passed through holes (not shown) in the flanges thereby securing the first portion 128 of the support band 106 to the second portion 130 of the support band 106. It should be understood that the support band 106 may be secured to a filter bowl by placing the first portion 128 and the second portion 130 of the support band 106 around the filter bowl and attaching the first portion 128 and the second portion 130 as described above.

Still referring to FIGS. 1 and 2, in general, the support arm 104 may be extended from the bracket body 102 and retracted towards the top plate 116 of the bracket body 102 by rotating the actuation knob 110 of the rod 108 such that the rod 108 is threaded out of or into the extension arm 104. Further, in the embodiment shown in FIGS. 1 and 2, the extension arm 104 may be rotated about the vertical axis of rotation $A_v$ when the extension arm 104 is fully extended from the bracket body 102 while in other embodiments, such as when the extension arm is circular in cross section (not shown), the extension arm 122 may be rotated about the vertical axis of rotation Av when the extension arm 104 is partially or fully retracted into the bracket body 102. The support band 106 is pivotally connected to the extension arm 104 such that the support band 106 may be rotated relative to the extension arm 104 about the horizontal axis of rotation $A_H$.

Figure 3:
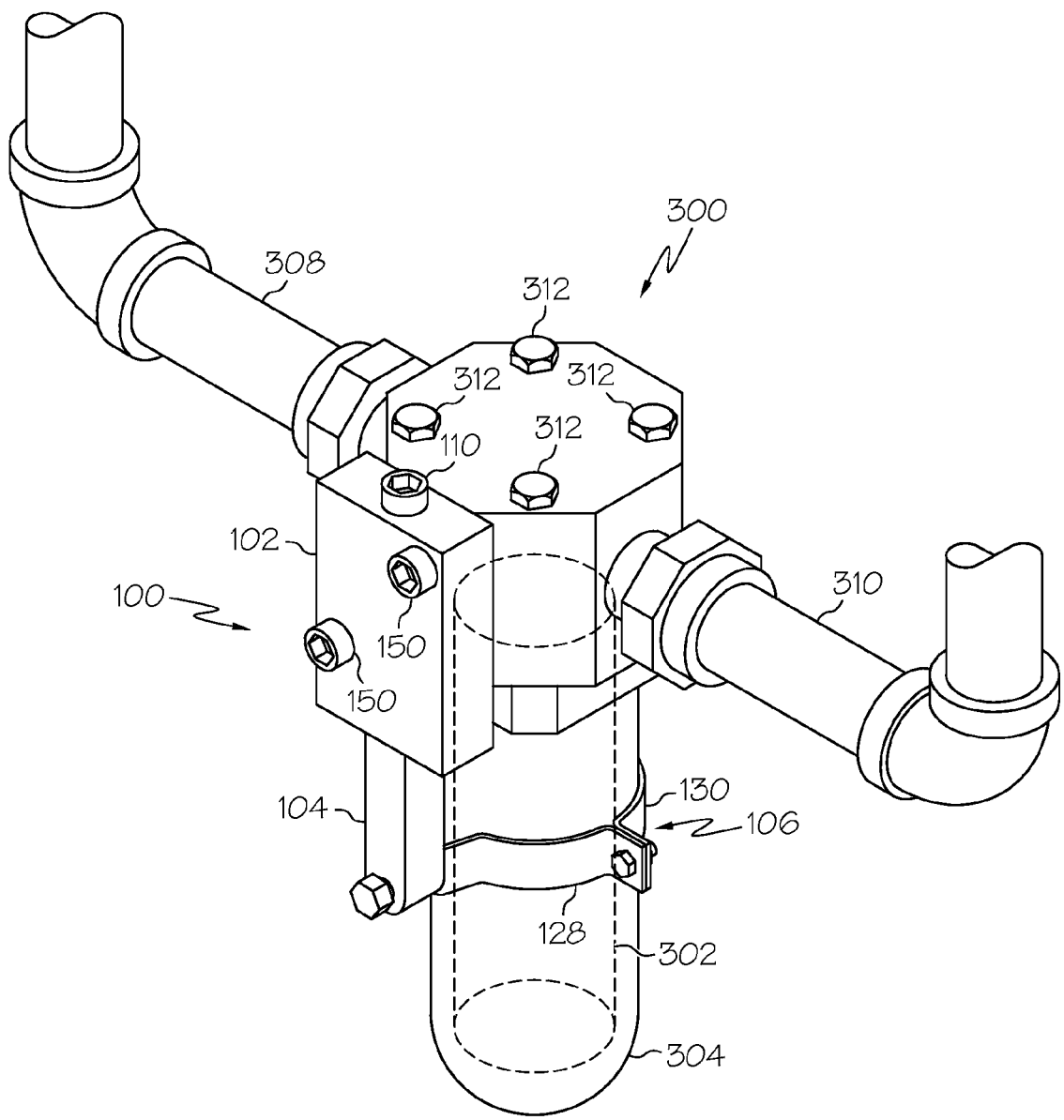
FIG. 3 depicts a filter system comprising a filter bowl support according to one or more embodiments shown and described herein.

Referring now to FIG. 3, a filter system 300 is shown according to one embodiment of the present invention. The filter system 300 may generally comprise a filter head 306, a filter bowl 304 and a filter bowl support 100. The filter head 302 facilitates connecting the filter system 300 to a fluid system. In general, the filter head 302 may be fluidly coupled to a fluid inlet pipe 308 and a fluid outlet pipe 310.

The filter system 300 may also include a filter bowl 304 fluidly coupled to the filter head 306 such that fluid entering the filter head 306 through the fluid inlet pipe 308 passes through the filter bowl 304 before exiting the filter system 300 through the fluid outlet pipe 310 connected to the filter head 306. In the embodiment shown, the filter bowl 304 may be attached to the filter head by threaded connectors, such as bolts 312, inserted through the filter head 306 and threaded into the filter bowl 304. In another embodiment (not shown), the filter bowl 304 may comprise a threaded portion and the filter head may comprise a corresponding threaded portion such that the filter bowl 304 may be threaded into the filter head 306 thereby securing the filter bowl 304 to the filter head 306. The filter bowl 306 may house filter media 304 such that fluid entering the filter system 300 through the inlet pipe 308 passes through the filter media 304 before exiting the filter system 300.

The filter system 300 may further include a filter bowl support 100, as described hereinabove. The filter bowl support 100 may be attached to the filter head 306 of the filter system 300. More specifically, the bracket body 102 of the filter bowl support 100 may be attached to the filter head 306 with threaded connectors, such as bolts 150, which extend through the bracket body 102 and into threaded holes (not shown) located in the filter head 306. The support band 106 of the filter bowl support 100, specifically the first portion 128 and the second portion 130 of the support band 106, are positioned around the filter bowl 304 and are secured together with threaded connectors 140 such that the filter bowl 304 is secured in the support band 106 and supported by the filter bowl support 100.

While specific reference has been made herein to the filter bowl support 100 being attached to the filter head 306 of the filter system 300 with threaded connectors, it should be understood that other forms of attachment may be used. For example, the bracket body 102 of the filter bowl support 100 may be welded to the filter head 306. Alternatively, the bracket body 102 of the filter bowl support 100 may be attached to the filter head 306 with an adhesive. In one embodiment, the bracket body 102 of the filter bowl support 100 may be integrally formed with the filter head 306 of the filter system 300. For example, when the filter bowl support 100 is integral with the filter system, the top plate and bottom plate of the bracket body may be integrally formed with or attached to the filter head 306 such that the filter head 306 forms the back plate of the bracket body. The rod, extension arm and support band may then be attached or incorporated into the bracket body as described hereinabove.

Figure 4:
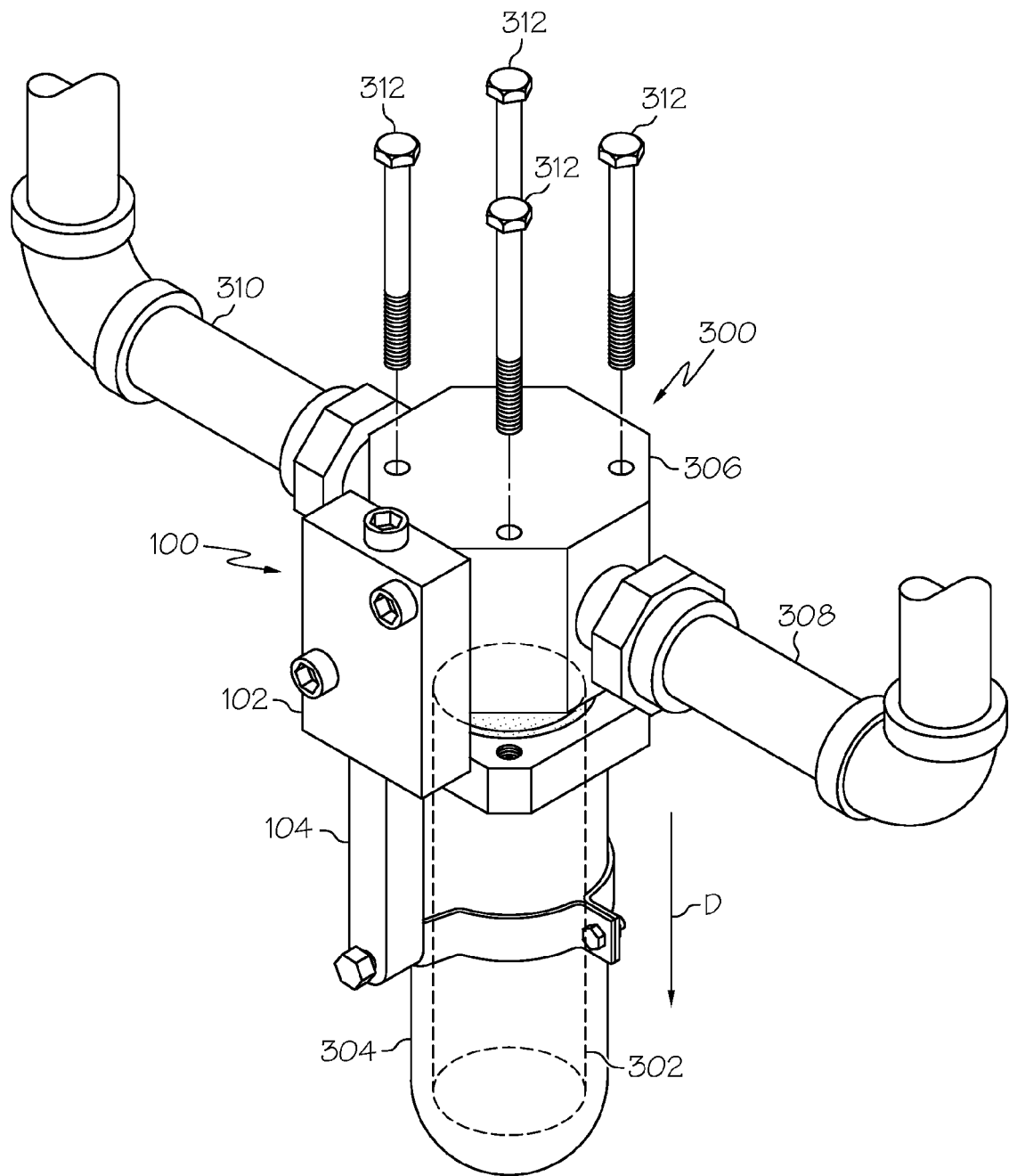
FIGS. 4-6 depict the filter bowl support being used to support a filter bowl of a filter system during a filter changing operation.
Figure 5:
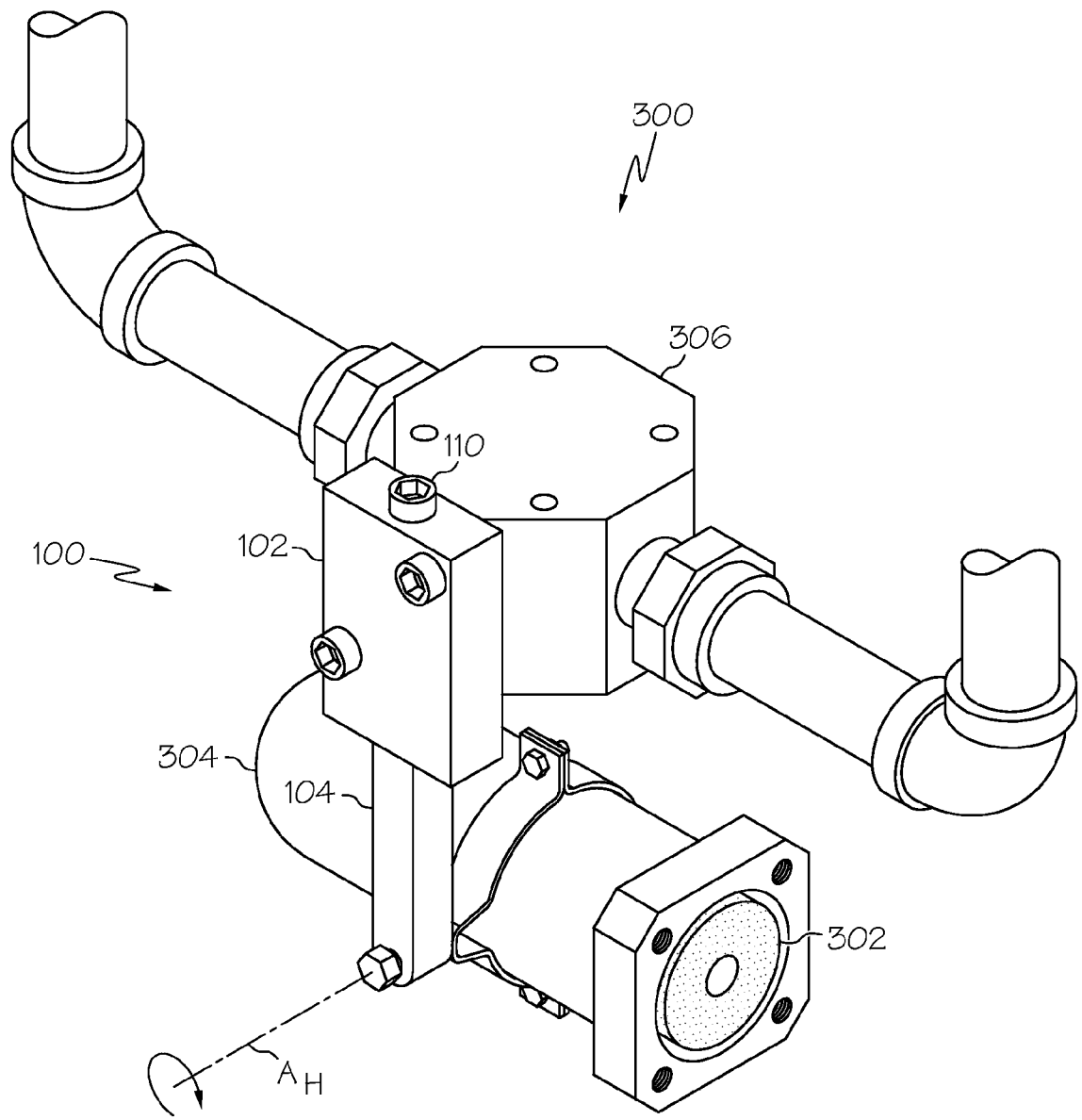

Referring now to FIGS. 4-6, the filter bowl support 100 is shown being used to support and position the filter bowl 304 relative to the filter head 306 in order to facilitate removal and replacement of the filter media 302 positioned in the filter bowl 304. To facilitate removal of the filter bowl 304 from the filter head 306, the bolts 312 securing the filter bowl 304 to the filter head 306 may be removed from the filter head 306 thereby allowing the filter bowl 304 to be lowered from the filter head 306 in the direction D indicated in FIG. 4. As the fasteners 312 are removed from the filter head 306 and the filter bowl 304 becomes detached from the filter head 306, the weight of the filter bowl 304, including the weight of the used filter media positioned in the filter bowl 304 and any excess liquid contained in the filter bowl 304, is supported by the filter bowl support 100 which, in turn, is attached to the filter head 306.

While FIG. 4 shows the filter bowl 304 attached to the filter head 306 with bolts 312, it should be understood that the filter bowl 304 may be threaded into the filter head 306 as described hereinabove. When the filter bowl 304 is threaded into the filter head 306, the filter support bracket 100 may be used to support the filter bowl 304 on the filter head 306 as the filter bowl 304 is unscrewed from the filter head 306 and subsequently detached from the filter head 306.

After the filter bowl 304 is detached from the filter head 306, the filter bowl 304 may be lowered with the filter bowl support 100 to provide additional clearance between the filter bowl 304 and the filter head 306. To lower the filter bowl 304, the actuator knob 110 may be rotated which, in turn, rotates the rod 108 disposed in the bracket body 102. The actuator knob 110 and rod 108 are rotated such that the rotation of the rod 108 causes the extension arm 104 to extend from the bracket body 102. As the extension arm 104 extends from the bracket body 102 the filter bowl 304, which is attached to the extension arm 104 via the support band 106, is lowered relative to the filter head 306 thereby increasing the clearance between the filter bowl 304 and the filter head 306. In one embodiment, the actuator knob 110 and threaded rod 108 are rotated until the extension arm 104 is fully extended from the bracket body 102. In this configuration, the extension arm 104 and attached filter bowl may be rotated about the vertical axis $A_V$ such that the filter bowl 304 is not positioned directly under the filter head 306.

In one embodiment, after the filter bowl 304 is lowered from the filter head 306, the filter bowl 304 and attached support band 106 are rotated about the horizontal axis of rotation $A_H$ as shown in FIG. 5. In one embodiment, the filter bowl 304 is rotated about the horizontal axis of rotation $A_H$ by about 180 degrees such that the contents of the filter bowl 304, including any used filter media, excess liquid, and/or accumulated particulate matter, may be emptied into a receptacle (now shown) positioned beneath the filter bowl 304. In another embodiment, the filter bowl 304 is rotated about the horizontal axis of rotation $A_H$ such that the filter bowl 304 has a substantially horizontal orientation (e.g., the filter bowl 304 is rotated about the horizontal axis $A_H$ by about 90 degrees) such that any excess liquid may be emptied from the filter bowl 304 and into a receptacle positioned beneath the filter bowl 304. In this orientation, the filter media may be manually extracted from the filter bowl 304.

Thereafter, the extension arm 104 may be rotated about the vertical axis $A_V$ such that the filter bowl 304 is not positioned directly under the filter head 306, as described above and shown in FIG. 6. With the filter bowl 304 in this orientation, the interior portions of the filter head 306 may be accessed from the underside of the filter head and cleaned or otherwise maintained. In one embodiment, where the filter bowl 304 is positioned in a substantially horizontal orientation, the filter bowl 304 may be rotated an additional 90 degrees such that the filter bowl 304 is rotated 180 degrees about the horizontal axis $A_H$ from its initial position when attached to the filter head 306. Placing the filter bowl 304 in this orientation permits any excess fluid contained in the filter bowl 304 to drain.

While specific reference has been made herein to rotating the filter bowl 304 about the horizontal axis $A_H$ before rotating the filter bowl 304 about the vertical axis $A_V$, it should be understood that the filter bowl 304 may be rotated about the vertical axis $A_V$ before the filter bowl 304 is rotated about the horizontal axis $A_H$. Alternatively, the filter bowl 304 may be rotated about the horizontal axis $A_H$ and the vertical axis $A_V$ simultaneously.

After the filter bowl 304 has been cleaned and the filter media replaced, the filter bowl 304 is rotated about the vertical and horizontal axes such that the filter bowl 304 is positioned directly under the filter head 306. The actuation knob 110 may then be rotated to raise the filter bowl 304 towards the filter housing 306. More specifically, the actuation knob 110 and threaded rod 108 are rotated such that the rotation of the threaded rod 108 causes the extension arm 104 to retract into the bracket body 102 thereby raising the attached filter bowl 304. When the filter bowl 304 is positioned directly under the filter head 306, the threaded fasteners 312 may be re-inserted through the filter head 306 and threaded into the filter bowl 304 thereby securing the filter bowl 304 to the filter head 306.

It should now be understood that the filter bowl support described herein may be used in conjunction with a filter system to position and support a filter bowl during filter media changing operations and/or routine maintenance of the filter system thereby alleviating an ergonomic burden on the individual performing the filter media changing operation and/or the routine maintenance of the filter system. Moreover, it should be understood that the filter bowl support described herein may be retrofitted to existing filter systems. Alternatively, the filter bowl support may be a feature included on newly manufactured filter systems.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A support for supporting and positioning a filter bowl of a filter system, the support comprising a bracket body, a rod, an extension arm threadably connected to the rod, and a support band connected to and rotatable with respect to the extension arm, wherein:

the bracket body comprises a top plate comprising an opening for receiving the rod;

the rod is rotatably positioned in the opening in the top plate and extends from the top plate of the bracket body;

the extension arm is operable to extend from the bracket body or retract towards the top plate of the bracket body when the rod is rotated; and the support band is configured for attachment to the filter bowl of the filter system.

2. The support of claim 1 wherein the bracket body further comprises a bottom plate, wherein the bottom plate comprises an opening for slidably receiving the extension arm.

3. The support of claim 1 wherein the support band is rotatable about a substantially horizontal axis.

4. The support of claim 1 wherein the extension arm is rotatable about a substantially vertical axis.

5. The support of claim 1 wherein the rod comprises an actuation knob to facilitate rotation of the rod relative to the bracket body.

6. The support of claim 5 wherein the actuation knob comprises a socket.

7. The support of claim 1 wherein the support band comprises a first portion and a second portion removably attached to one another.

8. The support of claim 7 wherein:

the first portion is pivotally attached to the extension arm and comprises flanges at both ends of the first portion; and the second portion comprises flanges at both ends of the second portion, wherein the flanges of the first portion are removably attached to the corresponding flanges of the second portion.

9. A filter system comprising a filter head, a filter bowl and a filter bowl support, wherein:

the filter head comprises an inlet for receiving fluid from a fluid delivery system and an outlet for returning fluid to the fluid delivery system;

the filter bowl is fluidly coupled to and detachable from the filter head, wherein the filter bowl is operable to contain removable filter media for filtering fluid received through the inlet of the filter head;

the filter bowl support comprises a bracket body, an extension arm, a rod and a support band, wherein:

the bracket body comprises a top plate connected to the filter head, wherein the top plate comprises a hole for receiving the rod;

the rod is rotatably positioned in the hole in the top plate and extends from the top plate in a direction away from the top plate of the bracket body;

the extension arm is threadably connected to the rod such that rotation of the rod extends the extension arm from the bracket body or retracts the extension arm toward the top plate of the bracket body; and the support band is connected to the extension arm and is rotatable with respect to the extension arm, wherein the support band is secured to the filter bowl such that the filter bowl is supported by the filter bowl support when the filter bowl is detached from the filter head.

10. The filter system of claim 9 wherein the bracket body further comprises a bottom plate comprising an opening for slidably receiving the extension arm, wherein the bottom plate is connected to the filter head of the filter system.

11. The filter system of claim 10 wherein the top plate and the bottom plate of the bracket body are integrally formed with the filter head.

12. The support of claim 9 wherein the support band is rotatable about a substantially horizontal axis.

13. The support of claim 9 wherein the extension arm is rotatable about a substantially vertical axis.

14. The support of claim 9 wherein the rod comprises an actuation knob to facilitate rotation of the rod relative to the bracket body.

15. The support of claim 14 wherein the actuation knob comprises a socket.

16. The support of claim 9 wherein the support band comprises a first portion and a second portion removably attached to one another.

17. The support of claim 16 wherein:

the first portion is pivotally attached to the extension arm and comprises flanges at both ends of the first portion; and the second portion comprises flanges at both ends of second portion, wherein the flanges of the first portion are removably attached to the corresponding flanges of the second portion.

18. A method for changing filter media in a filter system comprising a filter bowl removably attached to a filter head, wherein the filter bowl is supported on the filter head with a filter bowl support comprising a bracket body connected to the filter head, a rod disposed and supported in the bracket body, an extension arm threadably connected to the rod, and a support band connected to and rotatable with respect to the extension arm, wherein the extension arm is extendable and retractable from the bracket body by rotating the rod with respect to the bracket body, and the support band is attached to the filter bowl, the method comprising:

detaching the filter bowl from the filter head such that the filter bowl is supported from the filter head with the filter bowl support;

lowering the filter bowl from the filter head by extending the extension arm from the bracket body of the filter bowl support;

rotating the filter bowl on the extension arm about a substantially horizontal axis such that the filter media contained in the filter bowl and any excess fluid and debris in the filter bowl are emptied from the filter bowl;

inserting filter media in the filter bowl;

rotating the filter bowl on the extension arm about the substantially horizontal axis such that the filter bowl is aligned with the filter head;

raising the filter bowl to the filter head by retracting the extension arm into the bracket body of the filter bowl support; and reattaching the filter bowl to the filter head.

19. The method of claim 18 further comprising rotating the extension arm about a substantially vertical axis after the filter bowl is detached from the filter head such that the filter bowl is not positioned directly under the filter head.

20. The method of claim 18 wherein, when the filter bowl is rotated on the extension arm about the substantially horizontal axis, the angle of rotation is 180 degrees or less.

* * * * *